(12) United States Patent
Sarkisian et al.

(10) Patent No.: US 8,851,652 B2
(45) Date of Patent: Oct. 7, 2014

(54) PRE-TREATMENT COMPOSITION

(75) Inventors: George Sarkisian, San Diego, CA (US); Elizabeth Ann Visnyak, San Diego, CA (US); Ali Emamjomeh, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/639,492

(22) PCT Filed: Jun. 14, 2010

(86) PCT No.: PCT/US2010/038562
§ 371 (c)(1),
(2), (4) Date: Oct. 4, 2012

(87) PCT Pub. No.: WO2011/159274
PCT Pub. Date: Dec. 22, 2011

(65) Prior Publication Data
US 2013/0076842 A1 Mar. 28, 2013

(51) Int. Cl.
*G01D 11/00* (2006.01)
*B41M 5/00* (2006.01)
*C09D 11/54* (2014.01)
*C09D 7/12* (2006.01)

(52) U.S. Cl.
CPC ........... *C09D 7/1216* (2013.01); *B41M 5/0017* (2013.01); *C09D 11/54* (2013.01)
USPC ....................................... 347/100

(58) Field of Classification Search
USPC ....................................... 347/100
See application file for complete search history.

(56) References Cited

U.S. PATENT DOCUMENTS

| 5,965,257 | A * | 10/1999 | Ahluwalia ..................... 428/357 |
| 7,157,504 | B2 | 1/2007 | Ma et al. |
| 2003/0018101 | A1 | 1/2003 | Botros et al. |
| 2003/0103129 | A1* | 6/2003 | Tanaka et al. ................. 347/105 |
| 2004/0139566 | A1 | 7/2004 | Szymanski |
| 2005/0274281 | A1 | 12/2005 | Jackson |
| 2006/0203056 | A1* | 9/2006 | Furukawa et al. .............. 347/96 |
| 2007/0056118 | A1 | 3/2007 | Ellis |
| 2007/0216742 | A1 | 9/2007 | Sarkisian et al. |
| 2007/0225401 | A1 | 9/2007 | Sarkisian et al. |
| 2008/0092309 | A1* | 4/2008 | Ellis et al. .......................... 8/478 |
| 2009/0234067 | A1* | 9/2009 | Kariya .......................... 524/599 |
| 2012/0314000 | A1* | 12/2012 | Sarkisian et al. ............... 347/21 |

FOREIGN PATENT DOCUMENTS

| CN | 101535424 | 9/2009 |
| EP | 1391312 | 2/2004 |
| JP | 2002079739 | 3/2002 |

(Continued)

OTHER PUBLICATIONS

International Search Report and Written Opinion for PCT/US2010/038562 dated Mar. 31, 2011 (8 pages).

(Continued)

*Primary Examiner* — Alessandro Amari
*Assistant Examiner* — Michael Konczal (57) ABSTRACT

Pre-treatment composition and printing method using such pre-treatment composition are disclosed. A disclosed example of the pre-treatment composition includes a liquid vehicle, a polyvalent metal salt as fixing agent, and a latex resin having an acid number of less than 20.

16 Claims, 1 Drawing Sheet

(56) References Cited

FOREIGN PATENT DOCUMENTS

| | | |
|---|---|---|
| JP | 2005074655 | 3/2005 |
| JP | 2006159426 | 6/2006 |
| JP | 2008266853 | 11/2008 |
| JP | 2009149774 | 7/2009 |
| JP | 2009299240 | 12/2009 |
| JP | 2010046945 | 3/2010 |
| JP | 2011168911 | 9/2011 |
| WO | WO 99/06219 | 2/1999 |
| WO | WO 2008/033569 | 3/2008 |
| WO | WO 2009/143233 | 11/2009 |

OTHER PUBLICATIONS

The Notification of the First Office Action for CN Application No. 201080066665.2 dated Oct. 22, 2013.

Supplementary European Search Report for S.N. PCT/US2010/038562 dated Aug. 6, 2013 (7 pages).

Supplementary European Search Report for S.N. PCT/US2011/025796 dated Aug. 6, 2013 (9 pages).

Supplementary European Search Report for S.N. PCT/US2011/025802 dated Sep. 2, 2013 (9 pages).

* cited by examiner

PRE-TREATMENT COMPOSITION

BACKGROUND

Inkjet technology has expanded its application to high-speed, commercial and industrial printing, in addition to home and office usage. This technology is a non-impact printing method in which an electronic signal controls and directs droplets or a stream of ink that can be deposited on a wide variety of substrates. Current inkjet printing technology involves forcing the ink drops through small nozzles by thermal ejection, piezoelectric pressure or oscillation, onto the surface of a media.

In addition to ink composition, a pre-treatment composition can be applied before an ink composition is established on the print recording medium in view of improving printing characteristics and attributes of the image. Such pre-treatment composition is often a substantially colorless liquid that interacts with the colorant and/or with polymeric components of the ink composition to thereby precipitate or, otherwise, fix the ink composition to the print media surface. Within the use of such pre-treatment composition, the precipitated colorants tend to deposit on the surface of the recording media, which results thus in the enhancement of image quality attributes, such as, for example, good optical density and, also, allow high speed printing. Pre-treatment formulations are therefore desirable to have more stable and reliable pre-treatment compositions that will produce higher quality print images on the print media surfaces.

BRIEF DESCRIPTION OF THE DRAWING

In order to better understand the present disclosure, some embodiments will be described below by way of non-limiting examples only, with reverence to figures, wherein.

DETAILED DESCRIPTION

Before particular embodiments of the present invention are disclosed and described, it is to be understood that the present disclosure is not limited to the particular process and materials disclosed herein. It is also to be understood that the terminology used herein is used for describing particular embodiments only and is not intended to be limiting, as the scope of the present invention will be defined only by the claims and equivalents thereof. In describing and claiming the present exemplary composition and method, the following terminology will be used: the singular forms "a", "an", and "the" include plural referents unless the context clearly dictates otherwise. Thus, for example, reference to "a pigment" includes reference to one or more of such materials. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc. Wt % means herein percentage by weight. All percents are by weight unless otherwise indicated.

As used herein, "image" refers to marks, signs, symbols, figures, indications, and/or appearances deposited upon a material or substrate with either visible or an invisible ink composition. Examples of an image can include characters, words, numbers, alpha-numeric symbols, punctuation, text, lines, underlines, highlights, and the like.

In some embodiments, the present disclosure refers to a pre-treatment composition that includes a liquid vehicle, a polyvalent metal salt as fixing agent and a latex resin having an acid number of less than 20.

In addition, the present disclosure refers to a method for printing durable images onto a recording medium. In some embodiments, such method includes applying a pre-treatment composition onto a recording medium said pre-treatment composition including a liquid vehicle, a polyvalent metal salt as fixing agent, and a latex resin having an acid number of less than 20. An ink composition, containing an aqueous liquid vehicle and a colorant, is then applied to the recording medium. In some examples, the ink composition overprints said pre-treatment composition.

In some embodiments, the pre-treatment composition is applied onto said recording medium using coating devices and said the ink composition is jetted onto said recording medium via inkjet nozzles.

Without being linked by any theory, it is believed that after the pre-treatment composition is overprinted with the ink composition on the substrate or, in other words, when ink and pre-treatment composition meet on the media surface, an effective immobilization of ink colorants is realized and nearly all the colorants are deposited on the surface of the media rather than penetrating the media and depositing below the surface. Concurrently, the pre-treatment composition vehicle, upon mixing with the ink vehicle, becomes highly wetting and the mixed vehicle quickly penetrates the media, leaving the colorants behind. Thus, in some embodiments, the pre-treatment composition, upon contact with ink, causes the colorants present in the ink formulation to precipitate out and result in the enhancement of image quality attributes, as for example, optical density, chroma, and durability. Within such printing method, the combination of pre-treatment composition and ink composition results in method that provide high quality and durable image prints. The use of the pre-treatment composition such as disclosed herein results in the enhancement of image quality attributes while enabling high-speed printing. Furthermore, the pre-treatment composition provides good image quality such as permanence and smudge resistance, and does not affect or control light fastness.

In addition, the pre-treatment composition is a stable composition, meaning thus that the pre-treatment composition does not present stability problems over time. In some embodiments, the use of the pre-treatment composition results in printed image having, at the same time, good image quality (such as improved gloss and KOD) and durability. In some other embodiments, the use of the pre-treatment composition is particularly effective on slow-absorbing media, such as coated offset media.

As used herein the pre-treatment composition is used as a fixing fluid composition in a printing method. The "pre-treatment composition" or "fixing fluid composition" contains an aqueous vehicle and an effective amount of one or more fixing agents. A fixing agent is an ingredient that initiates a change in the solubility or stability of the colorant and fixes the colorant in place in the printed image. An "effective amount" of fixing agents is an amount that is effective in achieving an improvement in print quality, e.g., decreased strikethrough and bleed, increased optical density (OD), chroma, edge acuity, and improved drip and smear fastness, as compared to a print that has not been fixed. The pre-treatment composition can be formulated for high spread and quick penetration and drying. The surface tension can be less than about 45 mN/m.

In some examples, pre-treatment compositions have a viscosity within the range of about 1.0 to about 2000 cps, and, in other examples, of about 10 to about 1000 cps. In yet other examples, pre-treatment compositions have a viscosity within the range of about 40 to about 100 cps as measured at 25° C., in order to achieve the desired rheological characteristics. As indicated above, the viscosity of the composition is conveniently regulated, for instance, by suitable choice of the quantity and the molecular weight of the binders resin, the organic solvent, and other agents.

In some examples, the pre-treatment composition of the present disclosure improves print quality (such as chroma and bleed) and durability of the printed ink on a medium, i.e. increase the water-fastness, smudge-resistance, and light-fastness of the inks.

Exemplary embodiments of the pre-treatment compositions include, as a fixing agent, a polyvalent metal salt. The polyvalent metal salt component can be a divalent or a higher polyvalent metallic ion and anion. In some embodiments, the polyvalent metal salt components are soluble in water. Examples of polyvalent metallic ions include divalent metallic ions, such as $Ca^{2+}$, $Cu^{2+}$, $Ni^{2+}$, $Mg^{2+}$, $Zn^{2+}$ and $Ba^{2+}$; trivalent metallic ions, such as $Al^{3+}$, $Fe^{3+}$ and $Cr^{3+}$. In some examples, the polyvalent metallic ion is selected from the group consisting of $Ca^{2+}$, $Mg^{2+}$ or $Zn^{2+}$. In some other examples, the polyvalent metallic ions are $Ca^{2+}$. Examples of anions include $Cl^-$, $I^-$, $Br^-$, $NO_3^-$ or $RCOO^-$ (where R is H or any hydrocarbon chain). In some embodiments, the polyvalent metal salt anion is a chloride ($Cl^-$) or acetate ($CH_3COO^-$). In some embodiments, the polyvalent metal salt is composed of divalent or polyvalent metallic ions and of nitrate or carboxylate ions. The carboxylate ions are derived from a saturated aliphatic monocarboxylic acid having 1 to 6 carbon atoms or a carbocyclic monocarboxylic acid having 7 to 11 carbon atoms. Examples of saturated aliphatic monocarboxylic acid having 1 to 6 carbon atoms include formic acid, acetic acid, propionic acid, butyric acid, isobutyric acid, valeric acid, isovaleric acid, pivalic acid and hexanoic acid.

In some embodiments, the fixing agent is a polyvalent metal salt selected from the group consisting of calcium chloride, calcium nitrate, magnesium nitrate, magnesium acetate or zinc acetate. In some other embodiments, the polyvalent metal salt is calcium chloride or calcium nitrate ($CaCl_2$ or $Ca(NO_3)_2$). In yet some other embodiments, the polyvalent metal salt is calcium chloride ($CaCl_2$).

In some examples, the fixing agent is present in the pre-treatment composition in an amount representing from about 1 to about 20 wt % of the total weight of the pre-treatment composition. In some other examples, the fixing agent is present in an amount representing from about 3 to about 15 wt % of the total weight of the pre-treatment composition. In yet some other examples, the fixing agent is present in an amount representing from about 5 to about 13 wt % of the total weight of the pre-treatment composition. In some other examples, the fixing agent is present in an amount representing from about 7 to about 9 wt % based on the total weight of the pre-treatment composition.

Exemplary embodiments of the pre-treatment composition include latex resin components. In some examples, the polymeric latex is a cationic, an anionic or an amphoteric polymeric latex. In some other examples, the pre-treatment composition contains an anionic latex resin component having low acid number. In some examples, the term latex refers herein to a group of preparations consisting of stable dispersions of polymeric micro-particles dispersed in an aqueous matrix. In some other examples, the latex resin components are present, in the composition, in the form of dispersed latex resin particles.

According to one exemplary embodiment, the latex resin has an acid number of less than 20. In some other embodiments, the latex resin has an acid number of less than 18. As used herein, the acid number (AN) refers to the acid number that has been measured by conductivity titration of the latent acid functions of the latex resin with nitric acid. As an example, the sample is made strongly basic with KOH then is titrated with 1% of $HNO_3$. The pH and conductivity curves are measured simultaneously.

In some examples, the latex resin is a resin made of polymer and copolymer selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers. In some other examples, the latex resin component is a latex containing particles of a vinyl acetate-based polymer, an acrylic polymer, a styrene polymer, an SBR-based polymer, a polyester-based polymer, a vinyl chloride-based polymer, or the like. In yet some other examples, the latex resin is a polymer or a copolymer selected from the group consisting of acrylic polymers, vinyl-acrylic copolymers and acrylic-polyurethane copolymers.

In some examples, the latex resin particles may have an average molecular weight (Mw) of 5,000 to 500,000. In some other examples, the latex resins have an average molecular weight (Mw) ranging from 150,000 to 300,000. In yet some other embodiments, the latex resins have an average molecular weight of about 250,000.

In some examples, the average particle diameter of the latex resin particles is from 10 nm to 1 μm and, as other examples, from 10 to 500 nm, and in yet other examples, from 50 nm to 250 nm. The particle size distribution of the latex is not particularly limited, and either latex having a broad particle size distribution or latex having a mono-dispersed particle size distribution may be used. It is also possible to use two or more kinds of polymer fine particles each having a mono-dispersed particle size distribution in combination.

In some examples, the glass transition temperature (Tg) of the resin latex ranges from −30° C. to 70° C. and, in some other examples, ranges from 0° C. to 50° C. In yet other examples, the glass transition temperature of the resin latex is below 40° C. In some examples, the glass transition temperature of the resin latex is below 30° C. The way of measuring the glass transition temperature (Tg) parameter is described in, for example, Polymer Handbook, 3rd Edition, authored by J. Brandrup, edited by E. H. Immergut, Wiley-Interscience, 1989.

In some embodiments, the latex resin of the present disclosure has an acid number of less than 20 and has a glass transition temperature that is below 40° C. In some other embodiments, the pre-treatment composition includes an anionic latex resin with an acid number below 20, with a glass transition temperature that is below 40° C. and with a molecular weight of approximately 250,000.

In some examples, the latex resin is present in the pre-treatment composition in an amount representing from about 1 to about 70 wt % of the total weight of the pre-treatment composition. In some other examples, the latex resin is present in an amount representing from about 10 to about 60 wt % of the total weight of the pre-treatment composition. In yet some other examples, the latex resin is present in an amount representing from about 20 to about 50 wt % of the total weight of the pre-treatment composition.

According to exemplary embodiments, the latex resin may include, but is in no way limited to latex resin sold under the name Hycar® or Vycar® (from Lubrizol Advanced Materials Inc.); Rhoplex® (from Rohm & Hass company); Neocar® (from Dow Chemical Comp); Aquacer® (fromBYC Inc) or Lucidene® (from Rohm & Haas company).

In some examples, the pre-treatment composition contains surfactants. Non-limiting examples of suitable surfactants include nonionic surfactant, cationic surfactant and combinations thereof. In some examples, the surfactants are nonionic surfactants. In some other examples, the surfactants are non-ionic surfactants selected from the group consisting of non-ionic fluorosurfactant, nonionic acetylenic diol surfactant, nonionic ethoxylated alcohol surfactant and combinations thereof. In a non-limitative example, the pre-treatment composition contains nonionic ethoxylated alcohol surfactant.

Several commercially available nonionic surfactants may be used in the formulation of the pre-treatment composition, examples of which include ethoxylated alcohols such as those from the Tergitol® series (e.g., Tergitol® 15S30, Tergitol® 15S9), manufactured by Dow Chemical; surfactants from the Surfynol® series (e.g. Surfynol® 440 and Surfynol® 465), manufactured by Air Products and Chemicals, Inc.; fluorinated surfactants, such as those from the Zonyl® family (e.g., Zonyl® FSO and Zonyl® FSN surfactants), manufactured by E.I. DuPont de Nemours and Company; fluorinated Poly-Fox® nonionic surfactants (e.g., PF159 nonionic surfactants), manufactured by Omnova; or combinations thereof. Suitable cationic surfactants that may be used in the pre-treatment composition include long chain amines and/or their salts, acrylated diamines, polyamines and/or their salts, quaternary ammonium salts, polyoxyethylenated long-chain amines, quaternized polyoxyethylenated long-chain amines, and/or combinations thereof.

In some examples, the surfactant is present in the pre-treatment composition in an amount up to about 1.5 weight percentage (wt %). As a non-limiting example, the surfactant is present in an amount ranging from about 0.1 wt % to about 1 wt %. In still another non-limiting example, the surfactant is present in an amount ranging from about 0.2 wt % to about 0.6 wt %.

In some examples, the pre-treatment composition includes an aqueous vehicle. The term "aqueous vehicle," as defined herein, refers to the aqueous mix in which the fixing agent is placed to form the pre-treatment compositions. Examples of suitable aqueous vehicle components include, but are not limited to, water, co-solvents, surfactants, additives (corrosion inhibitors, salts, etc.), and/or combinations thereof. In some examples, the aqueous vehicle includes a water soluble organic co-solvent, a surfactant, and water. Non-limiting examples of the water soluble organic co-solvent include 2-ethyl-2-hydroxymethyl-1,3-propanediol, glycerol propoxylate, tripropylene glycol, 1-(2-hydroxyethyl)-2-pyrrolidinone, 1-(2-hydroxyethyl)-2-imidazolidinone, and/or combinations thereof. The previously listed solvents are suitable for any embodiments of the pre-treatment composition disclosed herein, particularly when using embodiments of the pre-treatment composition including amine-N-oxide and cationic polyelectrolytes. Other suitable solvents for embodiments of the pre-treatment composition includes at least the amine-N-oxide and the acid include ethylene glycol, diethylene glycol, triethylene glycol, 1-propoxy-2-propanol (commercially available as Dowanol® PNP from The Dow Chemical Co., Midland, Mich.), and combinations thereof. In some examples, the organic co-solvent is present in the pre-treatment compositions composition in an amount up to about 25 wt %. In a non-limiting example, the organic co-solvent ranges from about 0 wt % to about 20 wt %.

One or more additives may also be incorporated into any of the embodiments of the pre-treatment composition. As used herein, the term "additive" refers to a constituent of the fluid that operates to enhance performances, environmental effects, aesthetic effects, or other similar properties of the composition. Examples of suitable additives include biocides, sequestering agents, chelating agents, viscosity modifiers, anti-corrosion agents, marker dyes (e.g., visible, ultraviolet, infrared, fluorescent, etc.), dyes, optical whiteners, brighteners, and/or the like, and/or combinations thereof. The pre-treatment composition may also include a marker dye such as, for example, Basic Violet 16 (BV 16). In other examples, the additives are present in the pre-treatment composition in an amount ranging from about 0.01 wt % to about 1 wt %. In one example, about 0.05 wt % of the additive is present.

An exemplary method for printing durable images onto a recording medium includes applying the pre-treatment composition, such as defined above, onto a recording medium and applying an aqueous ink composition onto said recording medium, said ink composition includes an aqueous liquid vehicle and a colorant. In some example, the ink overprints the pre-treatment composition. Such printing method results in printed media that have an improved durability, as well as reduce bleeding and coalescence issues. As durability improvement, it is meant herein that the use of pre-treatment composition provides robustness to dry finishing as well as wet durability. In addition, the image forming method described herein produces printed images of high quality and enables high-speed printing.

In some embodiments, the printing method provides printed image having, in the same time, good image quality (such as improved gloss and KOD) and durability. In some other examples, the printing method is particularly effective on slow-absorbing recording medium, such as coated offset media.

In some examples, the image forming method includes depositing a pre-treatment composition on a recording medium, then jetting a aqueous ink composition that will react with the a pre-treatment composition liquid.

In some examples, the method for printing durable images is an inkjet printing method. By inkjet printing method, it is meant herein a method wherein a stream of droplets of ink is jetted onto a recording substrate or medium to form the desired printed image. The ink composition may be established on the recording medium via any suitable inkjet printing technique. Examples of inkjet method include methods such as a charge control method which uses electrostatic attraction to eject ink, a drop-on-demand method which uses vibration pressure of a piezo element, an acoustic ink jet method in which an electric signal is transformed into an acoustic beam and ink is irradiated with the acoustic beam so as to be ejected by radiation pressure, and a thermal inkjet method which uses pressure caused by bubbles formed by heating ink. Non-limitative examples of such inkjet printing techniques include thus thermal, acoustic, and piezoelectric inkjet printing. In some examples, the ink composition is jetted onto the recording medium using an inkjet nozzle and/or an inkjet printhead. In some other examples, the ink composition is jetted onto the recording method using thermal inkjet printheads.

In some examples, the method for printing durable inkjet ink images is a high-speed printing method. By high speed, it is meant herein a method capable of printing more than 50 of feet per minute. As an example, the web speed could be from about 50 to about 2000 feet per minute. In some examples, the printing method is well suited for high speeds industrial and for commercial printing. In some other examples, the printing method is well adapted for in-line and high-through put printing applications.

An exemplary method for printing durable images onto a recording medium includes applying the pre-treatment composition, such as defined above, onto a recording medium using coater or coating devices and jetting an ink composition onto said recording medium via inkjet nozzles, said ink composition including an aqueous liquid vehicle and a colorant.

The coater is not particularly limited and can be appropriately selected from known coaters according to the intended use. Examples of coater include an air doctor coater, a blade coater, a rod coater, a knife coater, a squeeze coater, an impregnation coater, a reverse roll coater, a transfer roll coater, a gravure coater, a kiss-roll coater, a cast coater, a spray coater, a curtain coater, and an extrusion coater. Details of the method may be referenced in "Coating Kogaku (Coating Engineering)", by Yuji Harasaki. In some example, the coater is a transfer roll coating device. In order to apply the pre-treatment composition to the recording medium with a uniform thickness, an air-knife may be used for the coating or a member having an acute angle may be positioned with a gap corresponding to the predetermined amount of pre-treatment composition, between the member and the recording medium.

In some other examples, the application of the pre-treatment composition may be done by any known commercial methods such as gravure, inkjet method, spray coating method, and roller coating method. In some example, the pre-treatment composition is applied by a coating method using rollers. Thus, as an example, the pre-treatment composition is rolled on recording medium using commercial roll coating equipment. Exemplary method for printing durable inkjet ink images onto a recording medium includes thus applying the pre-treatment composition onto the recording medium with rollers or transfer roll coating devices. In some examples, a set of more than 3 rollers can be used. In some other examples, the printing method uses about up to 30 rollers.

As an example, within such method, the pre-treatment composition is received onto a first surface, and then a contact is formed between the first surface and a transfer roll. The pre-treatment composition is then transferred from the first surface to the transfer roll. Finally, the pre-treatment composition is transferred from the transfer roller to a print medium. In one approach, the pre-treatment composition is applied to a print recording medium just before the printing of inks by printheads. According to this method, one or several rollers receive the pre-treatment composition and transfer it to a print medium. Thereafter, the print media receives inkjet ink from one or more inkjet printheads.

In some examples, the pre-treatment composition is applied to a recording medium using coating devices and, subsequently, the ink is jetted by inkjet nozzles to record an image. Said inkjet ink composition includes an aqueous liquid vehicle and a colorant, wherein the inkjet ink overprint said pre-treatment composition. In some examples, the ink composition is applied to the recording medium using inkjet nozzles, and is applied after the application of the pre-treatment composition.

In some examples, the time interval between the finishing point of the application of the pre-treatment composition on the recording medium and between the starting point of the application of the ink composition is between 0.0001 seconds and 80 seconds. In some other examples, the time interval is between 0.0001 second and 10 second. In yet some other examples, the time interval is between 0.0001 second and 1 second. In some examples, the time interval is below 5 seconds. In some examples, the aqueous ink composition is jetted onto a recording medium just after the application of the pre-treatment composition, while the pre-treatment composition is still wet on the recording medium, ensuring a proper mixture between the aqueous ink composition and the pre-treatment composition.

In some examples, the printing method may further include a drying process in which the solvent (especially water) present in the ink composition is removed by drying. Thus, in some examples, as a further step, the recording medium is submitted to a hot air drying systems. Alternatively, or in combination with the drying process, a process may be provided in which the solvent in the ink is removed by absorbing the solvent by contacting a roller made of a porous material or the like with the surface of the recording medium. Further, a fixing process may be provided in which the image formed on the recording medium is fixed by at least one of a pressure-application means that applies.

In some examples, the ink composition is established on at least a portion of the recording medium to form an image. In some other examples, the pre-treatment composition may be readily applied to the almost entire area of recording side of the recording medium, including an image portion to which ink droplets is to be applied by ink ejection unit. In some example, the pre-treatment composition is established below the ink composition. The amount of pre-treatment composition and/or ink composition used depends, at least in part, on the desirable image to be formed.

As an illustrative example, the recording medium or substrate is paper (non-limitative examples of which include plain copy paper or papers having recycled fibers therein), plain offset printing papers in roll form or photo-paper, and/or combinations thereof. In some examples, the recording medium has a thickness along substantially the entire length ranging between about 0.025 mm and about 0.5 mm. In some examples, the recording medium is a coated offset media. In some other examples, the recording medium is a non-porous recording medium. In some examples, the recording medium is an absorptive medium. The absorptive medium can be a slow-absorbing medium, such as coated offset media; or can be a fast-absorbing medium such as plain paper. In some examples, the recording medium used in the present printing method, is a slow-absorbing medium. In some other examples, the recording medium is a slow-absorbing, non-porous, recording medium.

It is to be understood that any number of colored ink compositions may be used in the method. Furthermore, any desirable combination of colored inks may be used. For example, each of the colored ink compositions may be of a different color, or two or more of the inks may be different shades of the same color (i.e., light magenta and dark magenta inks). In some examples of the method of the present disclosure, four different colored inks can be used: a black ink, a yellow ink, a cyan ink, and a magenta ink. In other examples, the method includes the use of any desirable number of inks selected from black ink, yellow ink, cyan ink, magenta ink, orange ink, red ink, green ink, and/or combinations thereof. In some examples, the method includes the use of the pre-treatment composition such as described herein and includes the use of at least an inkjet ink composition selected from a black ink, a yellow ink, a cyan ink, a magenta ink, an orange ink, a red ink, and a green ink. In some examples, at least one ink is deposited into individual printheads. Non-limiting examples of suitable printhead configurations include single printheads, dual chamber printheads, tri-chamber printheads and/or the like, and/or combinations thereof.

As an example, the pre-treatment composition and the ink composition are part of a printing system for printing durable inkjet images. Said printing system includes a pre-treatment composition applicator containing, at least, a transfer roller and a pre-treatment composition, and contains one or several successive inkjet printheads containing inkjet ink composition, said inkjet ink composition including an aqueous liquid vehicle and a colorant. In an example, the inkjet printheads are thermal inkjet printheads. In some examples, the printing system includes a pre-treatment composition applicator containing, at least, a transfer roller and a pre-treatment composition and, at least, four different successive inkjet printheads containing respectively, black, cyan, magenta and yellow inkjet ink compositions. The ink printing system, including the pre-treatment composition of the present disclosure, in addition to black and color inks, presents excellent printing performances and image characteristics.

In some examples, the present disclosure refers to a printing method and to a printing system containing an ink composition including a colorant dispersed in an ink vehicle and a pre-treatment composition such as described above. In some examples, the ink composition includes one or more colorants, an aqueous vehicle and, optionally, other ingredients such as surfactants, dispersants, binders, metal particles (such as used for MICR), and/or other additives and adjuvants well known in the relevant art. In some examples, the ink composition is an inkjet ink composition. In some other examples, the ink composition is an aqueous inkjet ink composition.

In some examples, the colorant is selected from a yellow colorant, a magenta colorant, a cyan colorant and a black colorant, and the ink vehicle includes at least one solvent present in an amount ranging from about 1 to about 25 wt %; at least one surfactant present in an amount ranging from about 0.1 to about 8 wt %; at least one polymer present in an amount ranging from about 0 to about 6 wt %; at least one additive present in an amount up to about 0.2 wt %; and water.

The colorant for each ink is selected from a pigment, a dye or combinations thereof. In some examples, the ink contains pigments as colorants. As used herein, "pigment" refers to a colorant particle that is substantially insoluble in the liquid vehicle in which it is used. Pigments can be dispersed using a separate dispersing agent, or can be self-dispersed, having a dispersing agent attached to the surface of the pigment. As used herein, "self-dispersed" generally refers to pigments that have been functionalized with a dispersing agent, such as by chemical attachment of the dispersing agent to the surface of the pigment. The dispersing agent can be a small molecule or a polymer or oligomer. The pigments include both self-dispersed pigments as well as dispersed pigments, e.g., pigments dispersed by a separate dispersing agent that is not covalently attached to the surface. In one example, the pigments are not self-dispersing, and a dispersing aid may be added to the vehicle. In another example, the pigments are self-dispersable and modified to include at least one polymer chemically attached thereto.

As alluded to, pigment colorant can be used in accordance with embodiments of the present disclosure. Specifically, if black is used, the black pigment can be any commercially available black pigment that provides acceptable optical density and print characteristics. Such black pigments can be manufactured by a variety of known methods such as channel methods, contact methods, furnace methods, acetylene methods, or thermal methods, and are commercially available from such vendors as Cabot Corporation, Columbian Chemicals Company, Evonik, Mitsubishi, and E.I. DuPont de Nemours and Company. For example, commercially available carbon black pigments include Color Black FW 200, Color Black FW 2V, Color Black FW1, Color Black FW 18, Color Black FW S160, Color Black FW S170, Printex including 95, 85, 75, 55, 45, 300, 35, 25, 200, 12, and Special Blacks including, 4A, 4, 5, 6, 550, 350, 250; BP1100, BP900, BP800, M1100, M900, M800, Monarch 1400, Monarch 1300, Monarch 1000, Monarch 900, Monarch 880, and Monarch 700; Cab-O-Jet 200 and Cab-O-Jet 300; Raven 2500 ultra, Raven 2000, Raven 7000, Raven 5750, Raven 5250, Raven 5000, and Raven 3500; 45 B, and combinations thereof. In addition to black, other pigment colorants can be used, such as cyan, magenta, yellow, blue, orange, green, pink, etc. Suitable organic pigments include, for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, anthanthrone pigments such as PR168, and the like. Representative examples of phthalocyanine blues and greens include copper phthalocyanine blue, copper phthalocyanine green and derivatives thereof (Pigment Blue 15 and Pigment Green 36). Representative examples of quinacridones include Pigment Orange 48, Pigment Orange 49, Pigment Red 122, Pigment Red 192, Pigment Red 202, Pigment Red 206, Pigment Red 209, Pigment Violet 19 and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 190, Pigment Red 189 and Pigment Red 224. Representative examples of thioindigoids include Pigment Red 86, Pigment Red 87, Pigment Red 198, Pigment Violet 36, and Pigment Violet 38. Representative examples of heterocyclic yellows include Pigment Yellow 1, Pigment Yellow 12, Pigment Yellow 13, Pigment Yellow 14, Pigment Yellow 17, Pigment Yellow 73, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in powder, press cake, or dispersion form from a number of sources. The pigments can be from about 5 nm to about 10 μm; in another example, the pigments can be from 10 nm to about 500 nm in size, although sizes outside this range can be used if the pigment can remain dispersed and provide adequate printing properties. In some examples, the amount of colorant present in the ink compositions ranges from about 2.0 wt % to about 4.5 wt %. It is to be understood however, that the colorant loading may be more or less, as desired.

As defined herein, an "ink vehicle" refers to the vehicle in which the colorant is placed to form the ink. A wide variety of ink vehicles may be used with the inks and printing methods according to embodiments disclosed herein. Non-limiting examples of suitable components for the ink vehicle include water-soluble polymers, anionic polymers, surfactants, solvents, co-solvents, buffers, biocides, sequestering agents, viscosity modifiers, surface-active agents, chelating agents, resins, and/or water, and/or combinations thereof.

Suitable solvents for the ink vehicle include, but are not limited to glycerol polyoxyethyl ether, tripropylene glycol, tetraethylene glycol, 1-(2-hydroxyethyl)-2-imidazolidinone, 1-(2-hydroxyethyl)-2-pyrrolidone, 1,6-hexanediol, 1,2,6-hexanetriol, trimethylolpropane, dipropylene glycol, Dantocol® DHE (Lonza Inc., Fairlawn N.J.), and/or combinations thereof. Inks used in combination with the pre-treatment composition having at least the amine-N-oxide and the acid therein may include one or more of the following solvents: ethylene glycol, diethylene glycol, triethylene glycol, or 1-propoxy-2-propanol. In a non-limiting example, the solvents are present in the ink vehicle in an amount ranging from about 1 wt % to about 25 wt %. In another non-limiting example, the solvents are present in the ink vehicle in an amount ranging from about 5 wt % to about 20 wt %. In still another non-limiting example, the solvents are present in the ink vehicle in an amount ranging from about 8 wt % to about 18 wt %. The amount and type of solvent used depends, at least in part, on the desirable properties of the ink. As such, the amounts may vary as desired. In some examples, a single solvent is used in the ink vehicle of one or more of the colored inks. Examples of such solvents include, but are not limited to tripropylene glycol, tetraethylene glycol, or 1-(2-hydroxyethyl)-2-pyrrolidone. In other examples, the inks include a mixture of two or more of the previously listed solvents.

In some examples, the total weight percent of the solvent mixture ranges from about 7 wt % to about 22 wt %. In other examples, the total weight percent of the solvent mixture ranges from about 12 wt % to about 17 wt %. In still other examples, the total weight percent of the solvent mixtures ranges from about 6 wt % to about 15 wt %.

In some embodiments, the ink composition includes water. In some examples, water is used as the ink carrier for the composition and is part of the liquid vehicle. In some other examples, the water makes up the balance of the ink composition, and may be present in an amount representing from about 40 to about 90 weight percentage or representing from about 50 to about 80 weight percentage by weight of the total composition.

The surfactants for the ink vehicle are generally nonionic or anionic. Suitable nonionic surfactants include, but are not limited to ethoxylated alcohols, fluorinated surfactants, 2-diglycol surfactants, and/or combinations thereof. Specific examples of nonionic surfactants include surfactants from the Surfynol® series (e.g., Surfynol® CT211, Surfynol® SEF), manufactured by Air Products and Chemicals, Inc., in addition to the surfactants (e.g., Tergitol®) provided hereinabove for the aqueous vehicle of the fixer. Non-limiting examples of suitable anionic surfactants for the ink vehicle include those anionic surfactants of the Dowfax® family (e.g., Dowfax® 8390), manufactured by Dow Chemical Company, located in Midland, Mich., or anionic Zonyl® surfactants (e.g., Zonyl® FSA), manufactured by E.I. DuPont de Nemours and Company; phosphate ester surfactants including the surfactants of the Emphos® series and the DeDophoS® series, both manufactured by Witco Corp., Middlebury, Conn., the surfactants of the Hostaphat® series, manufactured by Clariant GmbH, Frankfurt, Germany, the surfactants of the ESITerge® series, manufactured by Cook Composites and Polymers Co., Kansas City, Mo., the surfactants of the Emulgen® series, manufactured by Kao Specialties Americas LLC, High Point, Nalco, the surfactants of the Crodafos® series, manufactured by Croda Inc., Edison, N.J., the surfactants of the Dephotrope® series and of the DePHOS® series, both manufactured by DeForest Enterprises Inc., Boca Raton, Fla.; alkyl sulfates (e.g., lauryl sulfate), alkyl ether sulfates (e.g., sodium laureth sulfate); N-lauroyl sarcosinate; dodecylbenzene sulfonate; and/or combinations thereof. In some examples, the ink vehicle includes one or more surfactants present in an amount up to about 8 wt %, with other non-limiting examples including from about 0.1 wt % to about 6 wt % and from about 1.2 wt % to about 2 wt %.

In some embodiments, the ink vehicle can include a polymer present in an amount ranging from about 0.01 wt % to about 4 wt %. In other examples, the ink vehicle includes at least one polymer present in an amount ranging from about 0.1 wt % to about 1.5 wt %. The polymers for the ink vehicle are generally water-soluble, and may be selected from those of the salts of styrene-(meth)acrylic acid copolymers, polystyrene-acrylic polymers, polyurethanes, and/or other water-soluble polymeric binders, and/or combinations thereof Non-limiting examples of suitable polyurethanes include those that are commercially available from Dainippon Ink & Chem., Inc. (DIC), located in Osaka, Japan.

As a non-limiting example, one class of polymeric binders suitable for use in the ink includes salts of styrene-(meth)acrylic acid copolymers. A salt of a styrene-(meth)acrylic acid copolymer includes at least a styrene skeleton and a skeleton of the salt of the styrene-(meth)acrylic acid copolymer in its structure. It may also contain a skeleton derived from a monomer having another unsaturated group, such as a (meth)acrylate skeleton, in its structure. Suitable non-limiting examples of styrene-(meth)acrylic acid copolymers are commercially available and may be selected from the Joncryl® series (e.g., Joncryl® 586 and 683), manufactured by BASF Corp. located in Florham Park, N.J.; SMA-1000Na and SMA-1440K, manufactured by Sartomer, located in Exton, Pa.; Disperbyk 190, manufactured by BYK Chemicals, located in Wallingford, Conn.; polystyrene-acrylic polymers manufactured by Gifu Shellac, located in Japan; or combinations thereof.

Additives may also be incorporated into embodiments of the ink vehicle for the inks. As a non-limiting example, bactericides, such as Proxel® GXL, may be added to the ink to protect the ink from bacterial growth. Other suitable additives include, but are not limited to, buffers, biocides, sequestering agents, chelating agents, or the like, or combinations thereof. In some examples, the ink vehicle includes one or more additives present in an amount ranging from about 0.1 wt % to about 0.5 wt %. In other examples, no additives are present.

The inks are generally prepared by combining the solvents, the surfactants, any additives, and water, and adjusting the pH to a basic pH. In some examples, the pH of the ink ranges from about 7.0 to about 11. In other examples, the pH of the ink ranges from about 8.5 to about 9.5. Colorants and polymers are then added to form the ink compositions.

Ingredients and Abbreviations

Rhoplex® E-1691 is available from Rohm & Hass Company.

Hycar®2679, Hycar®0202, Vycar® 460x63 and Vycar® 460x46 are latex components available from Lubrizol Inc.

Lucidene®645 is an acrylic urethane polymer available from Rohm & Haas Company.

Neocar® latex 2300 is available from Dow Chemical Comp.

Ucar® Latex 455 is self-crosslinking acrylic latex from Dow chemical.

Suncryl® SV-100 is Styrene vinyl-acetate available from Omnova Inc.

Carboset® SA 860 is available from Lubrizol Inc.

Acronal® S 760 is a styrene acrylic latex polymer available from BASF.

Ucar® DT 400 is available from Dow chemical.

AC 420® is an acrylic polymer available from BG Bond.

LEG-1 is a co-solvent available from Liponics.

Zonyl® FSO is a surfactant available from Dupont Inc.

Surfynol® SEF is a surfactant available from Air Products.

Cab-O-Jet®300 is a self dispersed pigment available from Cabot Corporation

Joncryl®586 is a styrene-acrylic binder available from BASF Corp.

Example 1

Preparation of Ink Composition

A black inkjet ink composition is prepared in accordance with TABLE 1 below. All percentages are expressed in percentage by weight (wt %) based on the total weight of the ink composition.

TABLE 1

| Component | Amount (wt %) |
| --- | --- |
| BP 700 Black Pigment | 3.0 |
| Cab-O-Jet ® 300 | 1.0 |
| Joncryl ® 586 | 1.0 |
| 2-Pyrrolidone | 10.0 |
| LEG-1 | 1.0 |
| Zonyl ® FSO | 0.1 |
| Proxel ® GXL | 0.1 |
| Water | Balance |

Example 2

Preparation of Pre-Treatment Composition

Pre-treatment compositions 1, 2 and 3 are prepared in accordance with TABLE 2. All percentages are expressed by weight percentage (wt %) based on the total weight of the pre-treatment composition.

TABLE 2

| Component | Composition 1 | Composition 2 | Composition 3 |
| --- | --- | --- | --- |
| Calcium Chloride | 9.0 | 7.0 | 7.0 |
| Neocar ® latex 2300 | 40.0 | — | — |
| Rhoplex ® E-1691 | — | 24.0 | — |
| Lucidene 645 ® | — | — | 33.0 |
| Zonyl ® FSO | 0.5 | 0.1 | 0.1 |
| 2-Pyrrolidone | 3.0 | 3.0 | 3.0 |
| Surfynol ® DF-210 | 0.5 | 0.5 | 0.5 |
| Proxel GXL ® | 0.1 | 0.1 | 0.1 |
| water | Up to 100% | Up to 100% | Up to 100% |

Pre-treatment compositions 1 through 3 are tested in combination with the black ink illustrated in example 1. Ink and pre-treatment compositions are established on Hewlett Packard coated offset media using Hewlett Packard 88-type printheads. Pre-treatment formulations are coated onto the media (the coat weight for a roll-on pre-treatment is 0.5 to 10 grams/sq meters) then 72 mg/300 dpi of black ink is printed on top of each pre-treatment formulations.

Example 3

Stability of Pre-Treatment Compositions

Pre-treatment composition 1, as illustrated in example 2, including $CaCl_2$ as metal salt, is tested with different resins having different acid number, for their stability after one week at 60° C. The results are illustrated in TABLE 3 below. Such test demonstrates that resins with low acid number (i.e. AN below 20) are stable with the fixing agent whereas the resin with high acid number are not.

TABLE 3

| Resin type | Acid number | Stability |
| --- | --- | --- |
| Rhoplex ® E-1691 | 7.59 | Yes |
| Neocar ® latex 2300 | 11.4 | Yes |
| Hycar ®2679 | 15.7 | Yes |
| Vycar ® 460 × 46 | 16.2 | Yes |
| AC 420 ® | 17.9 | Yes |
| Vycar ® 460 × 63 | 18.57 | Yes |
| Ucar ® 455 | 20.6 | no |
| Hycar ®0202 | 20.6 | no |
| Suncryl ® SV-100 | 24.4 | no |
| Carboset ® SA 860 | 32.3 | no |
| Acronal ® S 760 | 45.7 | no |
| Ucar ® DT 400 | 49.4 | no |

Example 4

Pre-Treatment Compositions Performances

Compositions I to V (such as illustrated in TABLE 4) are tested for their printing performances. In table 4, numbers represent the percentage per weight (wt %) based on the total weight of pre-treatment composition. The results are illustrated in TABLE 5.

TABLE 4

| | Composition I | Composition II | Comparative composition III | Comparative composition IV | Comparative composition V |
| --- | --- | --- | --- | --- | --- |
| Resin Neocar ®2300 | 30.0 | — | — | — | — |
| Resin Lucidene ® 645 | — | 33.0 | 33.0 | — | — |
| $CaCl_2$ | 15.0 | 15.0 | — | 15.0 | — |
| Zonyl ® FSO | 0.1 | 0.1 | 0.1 | 0.1 | 0.1 |
| 2-Pyrrolidone | 3.0 | 3.0 | 3.0 | 3.0 | 3.0 |
| Surfynol ® DF-210 | 0.5 | 0.5 | 0.5 | 0.5 | 0.5 |
| Proxel GXL ® | 0.1 | 0.1 | 0.1 | 0.1 | 0.1 |
| water | Up to 100% | Up to 100% | Up to 100% | Up to 100% | Up to 100% |

TABLE 5

| Performance | Composition I | Composition II | Comparative composition III | Comparative composition IV | Comparative composition V |
| --- | --- | --- | --- | --- | --- |
| Dry Rub, Eraser | −0.02 | 0.07 | No Data | 0.32 | 0.41 |

TABLE 5-continued

| Performance | Composition I | Composition II | Comparative composition III | Comparative composition IV | Comparative composition V |
|---|---|---|---|---|---|
| Gloss Change, Steel | −7.2 | −1.5 | Poor Bleed | −11.6 | No Data |
| Wet Rub | −0.11 | −0.06 | — | 0.08 | 0.95 |
| KOD | 1.67 | 1.92 | — | 1.60 | 1.68 |
| Bleed Control | Good | Good | Poor | Good | Poor |

Compositions and comparative compositions I to V are evaluated for durability resistances and for bleeding performances. For each print, before and after the test, the black optical density is measured using an X-Rite densitometer to measure the reflectance of the area filled.

KOD reflects the Black optical density of the print. The higher the KOD value, the darker the black colored image obtained.

Dry Rub and Wet Rub resistance tests refer to the ability of a printed image to resist appearance degradation upon dry or wet rubbing the image. The numbers herein refer to the difference in optical density that has been measured. The smaller the number is, the better the performance is.

Gloss Change refers to the amount of gloss that ink exhibits when established on a substrate. The Gloss change of the print media samples is evaluated before and after the durability test. The gloss level is measured at 60 degrees using a Micro-Haze-Plus Meter or a Micro-Tri-Gloss Meter (manufactured by BYK-Gardner, Geretsried, Germany).

Bleed Control is evaluated visually, color to color bleed is evaluated. The rating is based on the bleeding of the ink on the printing and on the presence of defects. "Poor" reflects the presence of multiple bleeding; "marginal" reflects the presence of some bleeding and "good" reflects no or negligible defects.

Example 5

Pre-Treatment Composition Performances

Several pre-treatment compositions based on formulation 1 and containing different levels of Neocar® latex 2300 (0, 12, 18, 24, 30, 36 42 and 48%) are evaluated for their printing performances and for their durability. Such different compositions are rolled on with an industrial coating fixture on media. Then, an identical image sequence is printed with black ink having formulation such as illustrated in Example 1, using a HP T-300 web-press.

Black optical density changes and gloss changes of the print media samples are evaluated. The KOD and the gloss changes are also evaluated after different durability tests using a Taber abrasion test instrument.

Black optical density (KOD) is the measurement of the change in reflectance $OD=\log_{10}(l_i/l_r)$, where $l_i$ is incident light intensities and $l_r$ is reflected light intensities. The higher the KOD value, the darker the black colored image obtained. For each print, before and after the durability test, the black optical density is measured using an X-Rite densitometer to measure the reflectance of the area filled.

As used herein, "gloss level" refers to the amount of gloss that ink exhibits when established on a substrate. The gloss change of the print media samples is evaluated: for each print, before and after the durability test, the gloss level is measured at 60 degrees using a Micro-Haze-Plus Meter or a Micro-Tri-Gloss Meter (manufactured by BYK-Gardner, Geretsried, Germany).

Resistance tests are performed onto the printed media. The "rub resistance" refers to the ability of a printed image to resist appearance degradation upon rubbing the image. Good rub resistance, upon rubbing, will tend to not transfer ink from a printed image to surrounding areas where the ink has not been printed, i.e., on another printed color or on the paper or other substrate. Three different abrasion tests are made: the 2 dry rubs with eraser (2R Eras), the steel tip#3 (2R Steel), and the 1 wet rub (1R wet). The differences of these tests are due to the abrasion tip used, the weight added and the number of inch strokes on the print.

In the "2 dry rubs with eraser" (2R Eras) test, the dry eraser test uses a hard eraser (sand paper) to abrade the print surface with two rubs on the same section of the print. The weigh used is 350 g pressure (simulating hand pressure). In the "steel tip#3" (2R Steel) test, the steel tip is made with a blunt steel of 0.25 inch diameter. The blunt tip is rounded and given a very smooth finish, so that the damage to the print simulates the burnishing effect that a fingernail might do to the print. In the "I wet rub" (1R wet) test, the wet rub uses 350 g weight, but only one stroke is used across the print. The tip used for the wet rub is a hard plastic tip covered with a wet tex-wipe. The tex-wipe is soaked in water just before the test.

Figure 1:
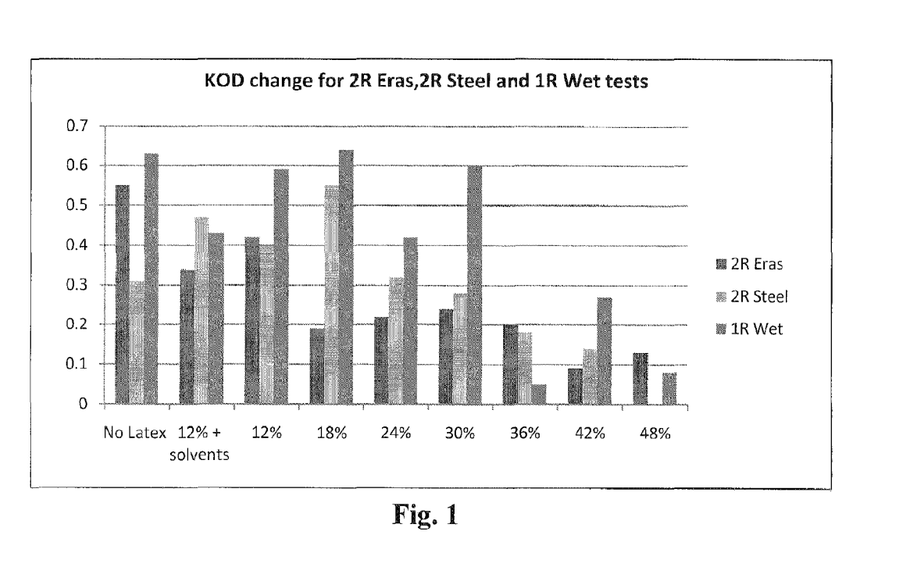
FIG. 1 is a chart representing black optical density changes of inkjet printing media printed with different pre-treatment compositions according to embodiments of the present disclosure.
Figure 2:
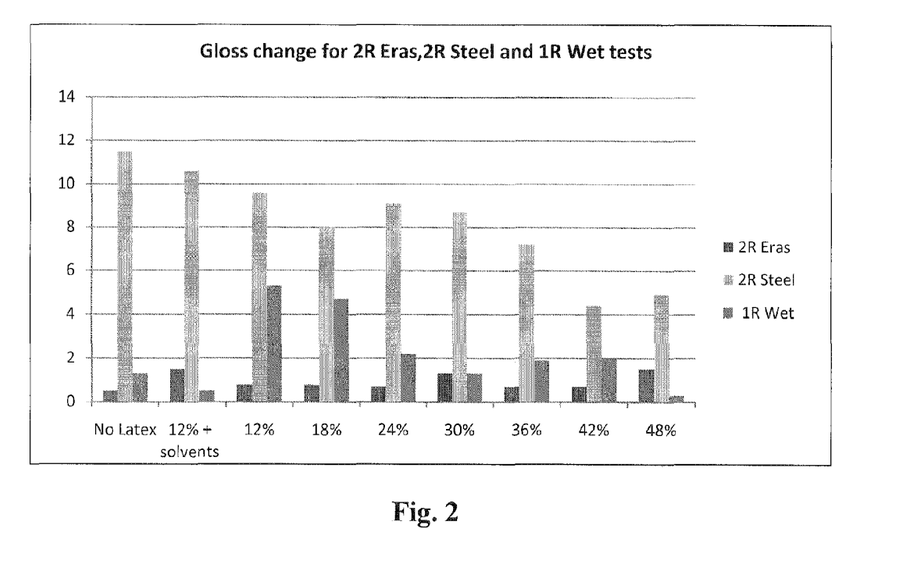
FIG. 2 is a chart representing gloss changes of inkjet printing media printed with different pre-treatment compositions according to embodiments of the present disclosure.

The results are illustrated in FIG. 1 and in FIG. 2. FIG. 1 illustrates Black optical density (KOD) comparison of inkjet printing media printed with different pre-treatment compositions. FIG. 2 illustrates and reflects the change in gloss of inkjet printing media printed with different pre-treatment compositions. According to this results, it is clear that the more resin is added, the better the results are, i.e. no change in the gloss and less change in the KOD.

The preceding description has been presented only to illustrate and describe exemplary embodiments of the present invention. Although certain example methods, compositions and articles of manufacture have been described herein, the scope of coverage of this patent is not limited thereto. On the contrary, this patent covers all methods, compositions and articles of manufacture fairly falling within the scope of the claims either literally or under the doctrine of equivalents.

The invention claimed is:

1. A pre-treatment composition, comprising:
   a. a liquid vehicle,
   b. a polyvalent metal salt as a fixing agent, and
   c. and an anionic latex resin, wherein the anionic latex resin has an acid number of less than 20 and a glass transition temperature that is less than 40° C.;
   wherein the anionic latex resin is a polymer or copolymer selected from the group consisting of a polyester, a vinylidene chloride, a butadiene, a styrene-butadiene, an acrylonitrile-butadiene, an acrylic-polyurethane, and a combination thereof.

2. The pre-treatment composition according to claim 1 wherein the fixing agent is a polyvalent metal salt selected from the group consisting of calcium chloride, calcium nitrate, magnesium nitrate, magnesium acetate and zinc acetate.

3. The pre-treatment composition according to claim 1 wherein the fixing agent is calcium chloride or calcium nitrate.

4. The pre-treatment composition according to claim 1 wherein the fixing agent is present in an amount representing from about 1 to about 20 wt % of the total weight of the pre-treatment composition.

5. The pre-treatment composition according to claim 1 wherein the acid number ranges from about 7 to about 18.

6. The pre-treatment composition according to claim 1 wherein the anionic latex resin has an average molecular weight ranging from 150,000 to 300,000.

7. The pre-treatment composition according to claim 1 having a viscosity within the range of about 1 to about 2000 cps as measured at 25° C.

8. The pre-treatment composition of claim 1 wherein the anionic latex resin is present in an amount representing from about 10 to about 60 wt % of the total weight of the pre-treatment composition.

9. The pre-treatment composition of claim 1 wherein the composition further comprises up to about 1.5 wt % of surfactants.

10. The pre-treatment composition of claim 1, wherein:
the anionic latex polymer is the acrylic-polyurethane polymer present in an amount of about 33 wt % of the total weight of the pre-treatment composition; and
the fixing agent is calcium chloride present in an amount of about 15 wt % of the total weight of the pre-treatment composition.

11. A recording medium, comprising:
a paper substrate; and
the pre-treatment composition of claim 1 coated on the paper substrate.

12. A method for printing durable images onto a recording medium, comprising:
a. applying a pre-treatment composition onto said recording medium, said pre-treatment composition comprising a liquid vehicle, a polyvalent metal salt as a fixing agent, and an anionic latex resin having an acid number of less than 20 and a glass transition temperature that is less than 40° C., wherein the anionic latex resin is a polymer or copolymer selected from the group consisting of a polyester, a vinylidene chloride, a butadiene, a styrene-butadiene, an acrylonitrile-butadiene, an acrylic-polyurethane, and a combination thereof; and
b. applying an ink composition onto said recording medium, said ink composition comprising an aqueous liquid vehicle and a colorant, wherein the ink composition is overprinted on said pre-treatment composition.

13. The printing method of claim 12 wherein the pre-treatment composition is applied onto said recording medium using coating devices and wherein the ink composition is jetted onto said recording medium via inkjet nozzles.

14. The printing method of claim 12 wherein a time interval between a finishing point of the application of the pre-treatment composition on the recording medium and between a starting point of applying the ink composition is between 0.0001 seconds and 80 seconds.

15. The printing method of claim 12 wherein the pre-treatment composition is rolled onto said recording medium using commercial roll coating equipment.

16. The printing method of claim 12 wherein the recording medium is a slow-absorbing non-porous recording medium.

* * * * *